United States Patent [19]

Knoll

[11] 4,109,307
[45] Aug. 22, 1978

[54] HIGH POWER FACTOR CONVERSION CIRCUITRY

[75] Inventor: William C. Knoll, Turbotville, Pa.

[73] Assignee: GTE Sylvania Incorporated, Stamford, Conn.

[21] Appl. No.: 793,875

[22] Filed: May 4, 1977

[51] Int. Cl.² .............................................. H02M 7/00
[52] U.S. Cl. .............................. 363/101; 331/113 A;
315/205; 315/220; 315/224; 315/247;
315/DIG. 7; 315/223
[58] Field of Search ................. 315/DIG. 7, 223, 224,
315/219, 247, 205, 220, 221; 363/19, 37, 101;
331/113 A

[56] References Cited

U.S. PATENT DOCUMENTS

| 4,005,335 | 1/1977 | Perper | 315/224 |
| 4,017,785 | 4/1977 | Perper | 315/221 X |
| 4,045,711 | 8/1977 | Pitel | 315/209 R |

Primary Examiner—Alfred E. Smith
Assistant Examiner—Charles F. Roberts
Attorney, Agent, or Firm—Norman J. O'Malley; Thomas H. Buffton; Robert T. Orner

[57] ABSTRACT

A high power factor conversion circuit suitable as a ballast circuit for lamps includes a full-wave rectifier coupled to an AC potential source and providing a pulsating DC potential. A high frequency inverter is coupled to a load circuit and to a feedback rectifier circuit supplying a rectified high frequency potential to an energy storage feedback circuit which provides energy in a manner to inhibit a decline in the pulsating DC potential thereby providing a substantially uniform DC potential to the high frequency inverter.

9 Claims, 6 Drawing Figures

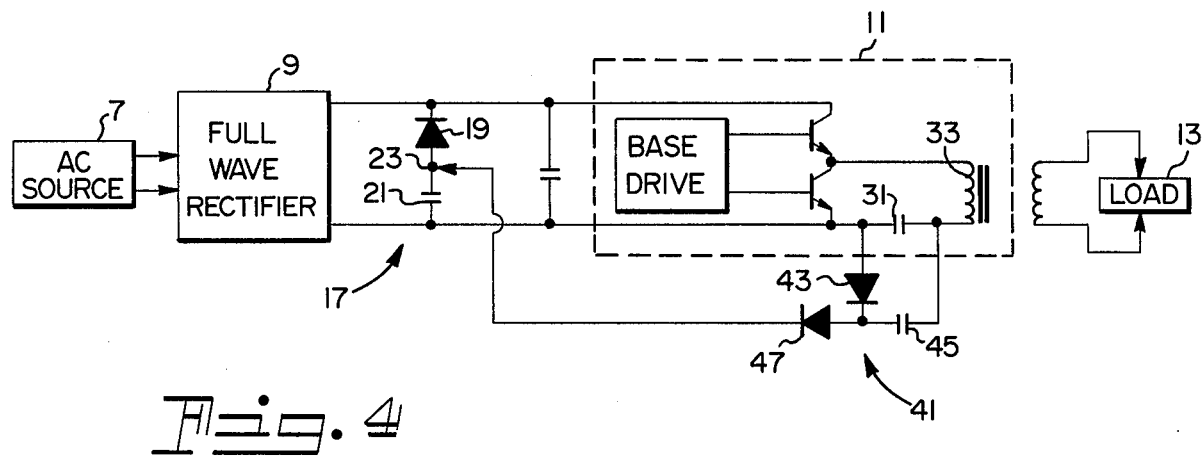
_Fig. 4_
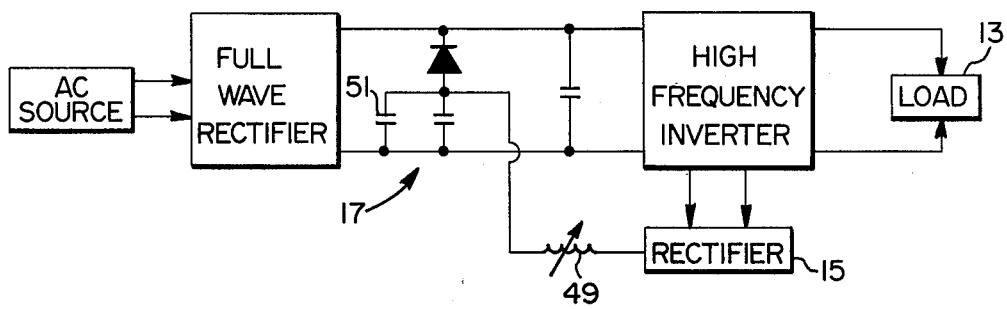
_Fig. 5_

HIGH POWER FACTOR CONVERSION CIRCUITRY

CROSS REFERENCE TO OTHER APPLICATIONS

A co-pending application bearing U.S. Pat. No. 4,045,711, filed Mar. 19, 1976, entitled "Tuned Oscillator Ballast Circuit", in the name of Ira Jay Pitel, and assigned to the Assignee of the present application relates to a high frequency ballast circuit having a single transformer and a clamping circuit to inhibit current build-up upon removal of the load. Another co-pending application filed Dec. 20, 1976 in the name of Ira Jay Pitel, bearing U.S. Pat. No. 4,075,476 entitled "Sinuosidal Wave Oscillator Ballast Circuit" and assigned to the Assignee of the present application is directed to a ballast circuit which includes a pair of transformers as well as circuitry to compensate for "storage time" in the transistor of an oscillator circuit.

BACKGROUND OF THE INVENTION

This invention relates to high power factor conversion circuitry and more particularly to high power factor ballast circuitry especially suitable for use with flourescent lamps.

At present, the most common form of ballast circuit for flourescent lamps is the 60-Hz auto-transformer type of ballast. However, it is well known that such apparatus is both heavy and cumbersome which are undesirable features for a structure which is frequently mounted overhead. Moreover, it is known that such apparatus is relatively inefficient which causes generation of undesired heat and energy losses.

Another form of ballast circuit utilizes a flip-flop oscillator and a saturable core transformer. The oscillator saturates and, in turn, saturates the core of the transformer to limit current flow. Unfortunately, core saturation characteristics are difficult to accurately predict. Thus, reliability and predictability of such apparatus leaves much to be desired.

Still another form of ballast circuit is disclosed in the above-mentioned co-pending U.S. applications assigned to the Assignee of the present application. Therein, a sinusoidal wave from an AC potential source is rectified to provide a pulsating DC potential. This pulsating DC potential is applied to an oscillator circuit which provides a high frequency output potential which is coupled to a lamp circuit. The circuitry also includes circuitry to compensate for "storage time" of the transistor as well as circuitry for clamping the rectifier to inhibit a "runaway" condition upon removal of the lamp load.

Although the above-mentioned high frequency ballast circuitry provides enhanced capabilities unattainable in previously known apparatus, it has been found that an improved response without deleterious effect on the power factor of the circuitry is a most desirable feature. Also, a reduction in circuit complexity without a decrease in power factor would be most desirable.

OBJECTS AND SUMMARY OF THE INVENTION

An object of the present invention is to provide circuitry for enhancing potential conversion without deleterious effect on the power factor. Another object of the invention is to improve the potential conversion capabilities of a ballast circuit without deleterious effects upon circuit power factor. Still another object of the invention is to provide ballast circuitry having a high frequency potential feedback capability suitable for altering available potentials to inhibit "turn-off" and "turn-on" of a lamp load.

These and other objects, advantages and capabilities are achieved in one aspect of the invention by a high power factor conversion circuit wherein a rectifier converts an AC potential to a DC pulsating potential which causes a high frequency inverter to develop a high frequency potential which is applied to a load. A feedback circuit rectifies the high frequency potential and applies the energy to the pulsating DC potential to inhibit the pulsating DC potential from decreasing below a given level and thereby provide a substantially uniform DC potential to the high frequency inverter.

BRIEF DESCRIPTION OF THE DRAWINGS

FIG. 4 is a block and schematic illustration of another alternate embodiment of the apparatus of FIG. 1;

FIG. 5 is a block and schematic illustration of additional features suitable to the apparatus of FIG. 1.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
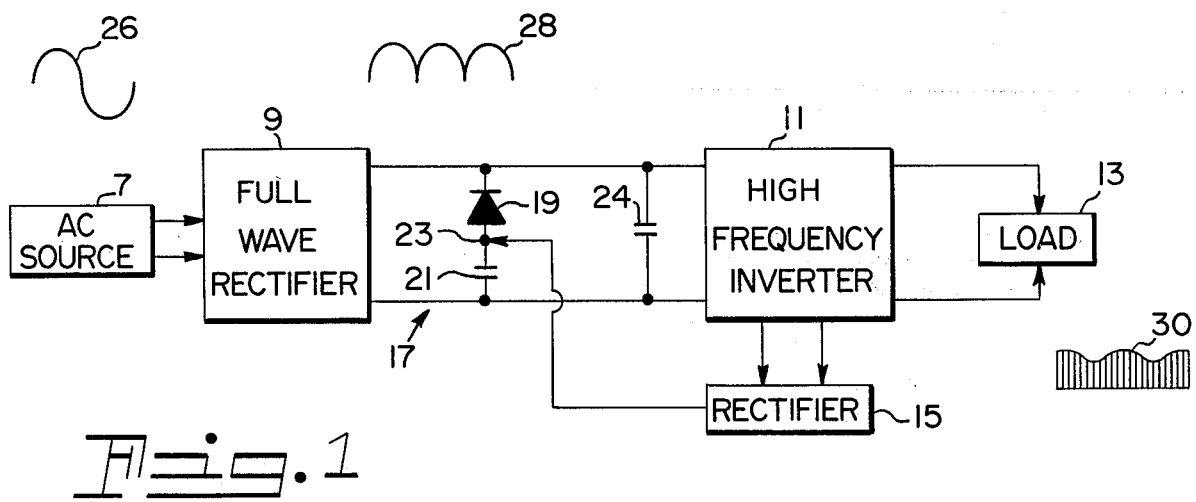
FIG. 1 is a block and schematic illustration of a preferred embodiment of the invention.

Referring to FIG. 1 of the drawings, a high power factor conversion circuit includes an AC potential source 7 coupled to a full-wave rectifier 9 wherein is provided a pulsating DC potential. This pulsating DC potential is applied to a high frequency inverter circuit 11 wherein is provided a high frequency output signal. This high frequency output signal is applied to a load circuit 13, which may be in the form of a pair of flourescent lamps for example.

The high frequency output signal from the high frequency inverter circuit 11 is also coupled to a feedback rectifier circuit 15. Therein, a rectifier DC potential is derived and fed back to a feedback circuit 17. The feedback circuit 17 includes a series connected isolating diode 19 and a charge storage capacitor 21 shunted across the full-wave rectifier 9. The rectified DC potential from the feedback rectifier circuit 15 is applied to the junction 23 of the series connected isolating diode 19 and charge storage capacitor 21. A high frequency bypass capacitor 24 also shunts the full wave rectifier 9 and feedback circuit 17.

As to operation, the full-wave rectifier 9 receives an AC potential 26 from the AC potential source 7 and provides a pulsating DC potential 28. Ordinarily, this pulsating DC potential 28 would be applied to the high frequency inverter circuit 11 and provide a high frequency output signal having an envelope substantially similar to the pulsating DC potential 28.

However, the high frequency output signal from the high frequency inverter circuit 11 is applied to a rectifier circuit 15. Therein, the high frequency output signal is rectified to provide a DC potential which is applied to the junction 23 of the feedback circuit 17. The isolating diode 19 inhibits the fed back DC potential from appearing at the output of the full wave rectifier 9 but allows the charge storage capacitor to build up a charge thereon.

As the pulsating DC potential 28 decreases to a given level, as determined by the charge on the capacitor 21 and the characteristics of the isolating diode 19, the charge from the capacitor 21 is applied to the output of the full-wave rectifier 9 via the diode 19 and serves to alter the pulsating DC potential 28 to a substantially uniform DC potential. As a result, the high frequency output signal 30 has a substantially uniform envelope as compared with the pulsating DC potential 28.

It should be noted that the isolating diode 19 serves to isolate the charging capacitor 21 from the line or pulsating DC potential source 9. At the same time, the charge capacitor 21 provides energy to the inverter whenever the level of the rectifier 9 decreases below a given value as determined by the charge on the capacitor 21 and the characteristics of the isolating diode 19. In this manner, the power factor of the apparatus is not deleteriously affected by the energy feedback circuitry but the pulsating DC potential is altered to provide a more constant DC potential. Thus, a more uniform DC potential reduces the undesired strobe effect on the load circuit characteristic of a pulsating DC potential but permits maintenance of the desired relatively high input power factor.

Figure 2:
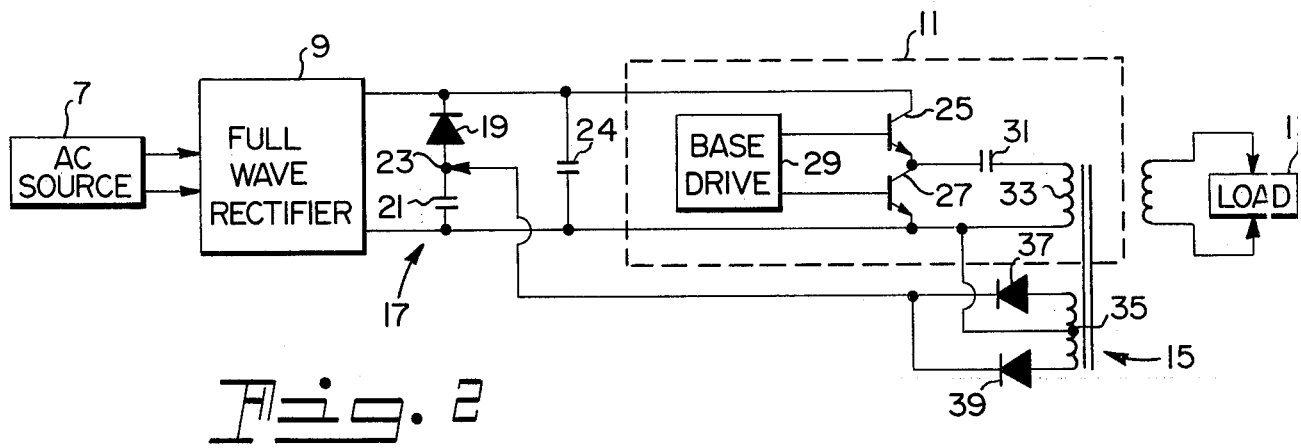
FIG. 2 is a block and schematic illustration of a specific embodiment of the apparatus of FIG. 1.

FIG. 2 illustrates a specific embodiment of the circuitry of FIG. 1. Herein, an AC potential source 7 is coupled to a full-wave rectifier circuit 9 which is, in turn, coupled to a high frequency inverter circuit 11. A load circuit 13 and a rectifier circuit 15 are coupled to the high frequency inverter circuit 11. The rectifier circuit 15 is coupled to a feedback circuit 17 having a series connected isolating diode 19 and charge storage capacitor 21 shunting the full-wave rectifier circuit 9 with a junction 23 of the feedback circuit 17 coupled to the rectifier circuit 15.

More specifically, the high frequency inverter circuit 11, often referred to as a high frequency chopper, includes a pair of series connected transistors 25 and 27 shunting the full-wave rectifier circuit 9 and feedback circuit 17 and coupled to a base drive circuit 29. A series connected capacitor 31 and inductor winding 33 are shunted across the second transistor 27 with the load circuit 13 coupled to the inductor winding 33. Also, the rectifier circuit 15 is in the form of an inductive winding 35 inductively coupled to the inductor winding 33 and having opposite ends each connected to a diode, 37 and 39 respectively. The diodes 37 and 39 are then connected to the junction 23 of the feedback circuit 17. Thus, the load circuit 13 and feedback rectifier circuit 15 are inductively coupled to the inductor winding 33 of the high frequency inverter circuit 11.

Figure 3:
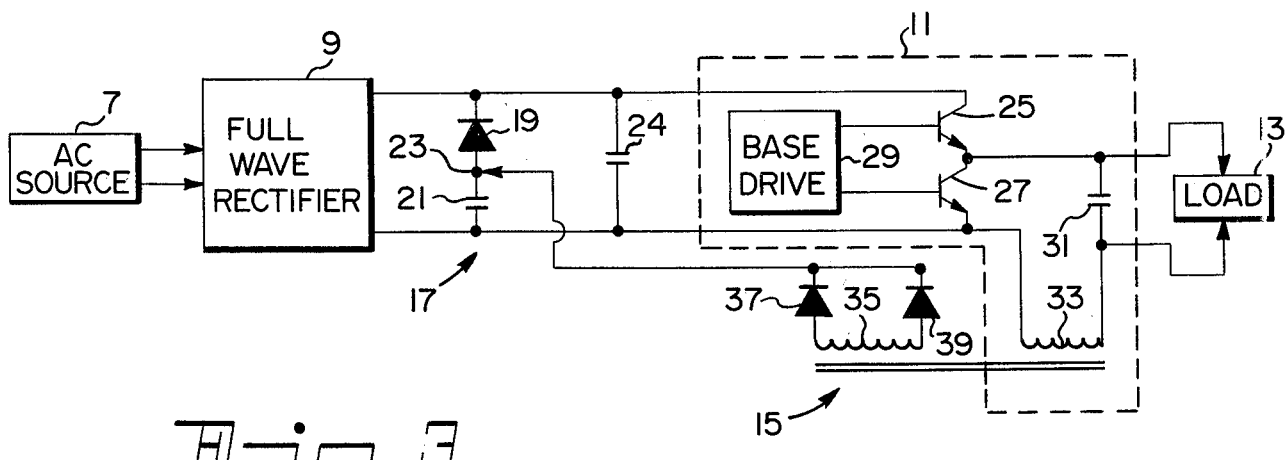
FIG. 3 is a block and schematic illustration of an alternate embodiment of the apparatus of FIG. 1.

FIG. 3 illustrates an alternate embodiment similar to the embodiment of FIG. 2. However, herein the load circuit 13 is shunted across the capacitor 31 rather than inductively coupled to the inductor winding 33. FIG. 4 is another somewhat similar circuit except that a voltage doubler 41 including a series connected first diode 43 and capacitor 45 shunting the capacitor 31 and a second diode 47 connected to the junction 23 of the feedback circuit 17 provides the rectified feedback potentials previously mentioned.

FIG. 5 illustrates still another embodiment of a high power factor conversion circuit. Herein is included the above-described feedback rectifier circuit 15 and feedback circuits 17 which operate in a manner substantially as previously described. However, herein is included an alterable inductor 49 which may be utilized to control the output power available to the load circuit 13 by controlling the amount of feedback energy and consequently, the clamping level of the DC potential. Also, an added capacitor 51 is shunted across the charge storage capacitor 21 and utilized to by-pass undesired surge currents and thereby reduce the stresses on the charge storage capacitor 21.

Figure 6:
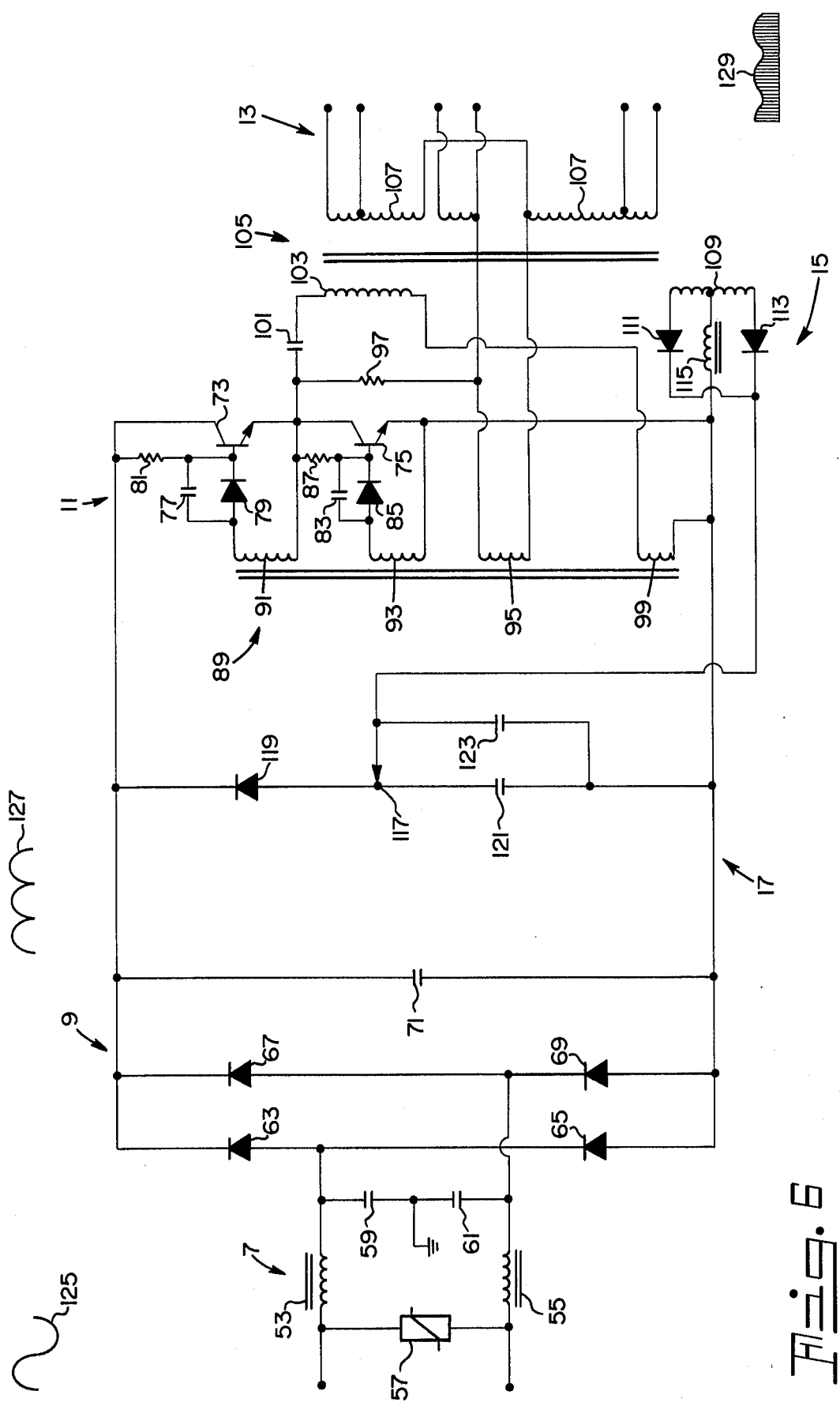
FIG. 6 is a schematic illustration of a preferred form of high power factor conversion circuitry.

As to a preferred embodiment, the schematic illustration of FIG. 6 illustrates an AC potential source 7 coupled to a full-wave rectifier circuit 9. The full-wave rectifier circuit 9 is connected to a high frequency inverter circuit 11 which is coupled to a load circuit 13 and to a feedback rectifier circuit 15. The feedback rectifier circuit 15 is coupled to a feedback circuit 17 shunting the full-wave rectifier circuit 9.

More specifically, the AC potential source 7 may include a power line conditioner circuit having first and second inductors 53 and 55 loosely coupled therebetween and each connected to an AC potential line to the full-wave rectifier circuit 9. The power line conditioner circuit also includes a transient suppressor 57 shunted across the AC potential lines and capacitors 59 and 61 connecting each of the AC potential lines to a reference such as circuit ground. This power line conditioner serves to reduce the inverter high frequency energy from being induced onto the power line.

The full-wave DC rectifier circuit 9 includes first, second, third and fourth diodes, 63, 65, 67, and 69 respectively, in a well-known bridge configuration. The junction of the first and second diodes 63 and 65 is coupled to the first inductor 53 while the junction of the third and fourth diodes 67 and 69 is coupled to the second inductor 55 of the AC potential source 7. Also, a low valued high frequency by-pass capacitor 71 shunts the diodes 63 and 65 and 67 and 69.

Coupled to the full-wave DC rectifier circuit 9 is a high frequency inverter circuit 11 in the form of a sinusoidal wave oscillator having first and second series connected transistors 73 and 75 which switch in a square wave fashion shunting the DC rectifier circuit 9. The first transistor 73 has a base bias circuit including a parallel connected capacitor 77 and diode 79 connected to the base electrode and via a resistor 81 to the collector electrode. Similarly, the second transistor 75 has a base bias circuit including a parallel connected capacitor 83 and diode 85 connected to the base electrode and via a resistor 87 to the collector electrode.

A first transformer 89 includes a split secondary winding having a first winding portion 91 connected to the junction of the capacitor 77 and diode 79 of the first transistor 73 bias circuit and to the junction of the series connected first and second transistors 73 and 75. A second winding portion 93 of the split secondary winding is connected to the junction of the capacitor 83 and the diode 85 of the bias circuit of the second transistor 75 and to the emitter electrode of the second transistor 75.

Another secondary winding 95 of the first transformer 89 is coupled by a resistor 97 to the junction of the series connected first and second transistors 73 and 75 and to the load circuit 13 in order to compensate for load variations as will be explained hereinafter. The primary winding 99 of the first transformer 89 is coupled to one side of the DC rectifier circuit 9 and in series with a capacitor 101 and the primary winding 101 of a second transformer 105. The series connected primary winding 103 and capacitor 101 form a resonant circuit, and in turn, connect to the junction of the first and second transistors 73 and 75.

A secondary winding 107 of the second transformer 105 serves as an inductive coupling for a load which may be in the form of flourescent lamps for example. The secondary winding 107 also includes provision for both filament and drive energization of a lamp load in this particular embodiment.

Another secondary winding 109 of the second transformer 105 is a part of a feedback rectifier circuit 15. The feedback rectifier circuit 15 includes diodes 111 and 113 each connected to an opposite end of the secondary winding 109 and an inductor 115 coupling the center tap of the secondary winding 109 to one side of the DC rectifier circuit 9.

The diodes 111 and 113 of the rectifier circuit 15 are coupled back to a feedback circuit 17. The feedback circuit 17 has a junction 117 coupled to the diodes 111 and 113 and to an isolating diode 119 and a charge storage capacitor 121 shunted by an additional capacitor 123. The series connected isolating diode 119 and capacitors 121 and 123 are shunted across the full-wave DC rectifier circuit 9.

As to operation, the power line conditioner of the AC potential source 7 serves as both a transient filter and a radio frequency interference (RFI) filter. As set forth in the previously mentioned U.S. application bearing U.S. Pat. No. 4,075,476, the transient suppressor 57 serves to "clip" undesired transient signals while the "clipped" signals are further filtered by a second or low-pass filter which includes the first and second inductors 53 and 55. Moreover, the inductors 53 and 55 tend to isolate the AC potential and the DC rectifier circuit 9 with respect to RFI signals whereby a high impedance is presented to signals directed toward the AC source.

The full-wave DC rectifier circuit 9 acts in accordance with well-known rectifier techniques. Herein, the rectifier circuit 9 receives a filtered AC potential 125 and provides a pulsating DC potential 127. Also, the by-pass capacitor 71 tends to eliminate or at least reduce any undesired high frequency signals or transients at the output of the DC rectifier circuit 9.

Ordinarily, the sinusoidal wave oscillator would receive the pulsed DC potential 127 at a frequency of about 120 Hz and provided a pulsed output signal at a resonant frequency of about 20 KHz. This output signal would appear across the resonant circuit of the series connected capacitor 101 and inductor winding 103 and be coupled to the secondary windings 107 of the load circuit 13. Thus, the potential across the windings 107 would increase until the lamps were "fired" whereupon the voltage would remain sufficient to maintain a lighted condition of the lamps.

At the same time, energy is supplied to the secondary windings 91 and 93 in an amount sufficient to provide proper base drive for the transistors 73 and 75. However, should a change in the load circuit 13 occur, due to lamp removal for example, the change would be fed back to the secondary windings 91 and 93 by way of the secondary winding 95. In this manner base drive for the transistors 73 and 75 is varied in accordance with the load and sudden removal of the load provides no deleterious effect upon the circuitry.

Further, the feedback rectifier circuit 15 includes a secondary winding 109 which is inductively coupled to the primary winding 103. This secondary winding receives the output signal, rectifies the output signal by way of the diodes 111 and 113 and feeds a rectified high frequency signal to the charging capacitors 121 and 123 of the feedback circuit 17.

The charged capacitors 121 and 123 continue to receive the fed back high frequency energy until their potential exceeds the potential of the pulsating DC potential 127 appearing at the output of the rectifier circuit 9. Thereupon, the isolating diode 119 is rendered conductive and the stored energy of the capacitors 121 and 123 serves to provide a substantially uniform DC potential as indicated by the waveform 129.

Since the feedback energy is isolated from the output of the DC rectifier circuit 9 by the isolating diode 119 except for periods when the energy of the capacitors 121 and 123 exceeds the potential of the DC rectifier 9, it has been found that the feedback circuitry 17 does not have a deleterious effect upon the power factor of the circuit. Also, it has been found that the more uniform DC potential, rather than the pulsating DC potential, substantially eliminates undesired "strobe" effects or "turn-on" and "turn-off" characteristics of the load circuitry.

Thus, there has been provided a unique high power factor conversion circuit especially suitable for use as a ballast circuit with a flourescent lamp load. The circuitry is especially efficient of energy, light in weight, easily constructed, and provides a power factor capability which is highly desirable. Also, the circuitry provides a feedback capability which essentially eliminates undesired "strobe" effects in a lamp type load circuit. Moreover, testing indicates an efficiency increase of about 23% when compared to a 60 Hz magnetic dual 40-watt ballast circuit.

While there has been shown and described what is at present considered preferred embodiments of the invention, it will be obvious to those skilled in the art that various changes and modifications may be made therein without departing from the scope of the invention as defined by the appended claims.

What is claimed is:

1. A high power factor conversion circuit comprising:
   an AC potential source;
   a full-wave DC rectifier means coupled to said AC potential source and providing a pulsating DC potential;
   a high frequency inverter means coupled to said DC rectifier means and including a series connected inductor and capacitor circuit;
   a load circuit coupled to said series connected inductor and capacitor circuit of said high frequency inverter means;
   a feedback rectifier circuit means coupled to said high frequency inverter means; and
   feedback circuit means including a series connected isolating diode and charge storage capacitor shunting said DC rectifier means with a junction therebetween coupled to said feedback rectifier circuit whereby high frequency energy from said inverter means is applied to said charge storage capacitor and utilized to convert said pulsating DC potential to a substantially uniform DC potential.

2. The high power factor conversion circuit of claim 1 wherein said load circuit is inductively coupled to said inductor of said series connected inductor and capacitor circuit of said high frequency inverter means.

3. The high power factor conversion circuit of claim 1 wherein said load circuit is shunted across said capacitor of said series connected inductor and capacitor circuit of said high frequency inverter means.

4. The high power factor conversion circuit of claim 1 wherein said feedback rectifier circuit means is in the form of an inductive winding coupled to said inductor of said series connected inductor and capacitor circuit of said high frequency inverter means and a pair of rectifier electron devices each connected to an opposite end of said inductive winding.

5. The high power factor conversion circuit of claim 1 wherein said feedback rectifier circuit means is in the form of a voltage doubler connected in circuit with said capacitor of said series connected inductor and capacitor circuit of said high frequency inverter means, said voltage doubler including a series connected first diode and capacitor shunting said capacitor of said series connected inductor and capacitor circuit and a second diode coupling the junction of said series connected first diode and capacitor to said feedback circuit means.

6. The high power factor conversion circuit of claim 1 wherein said feedback circuit means includes a second capacitor in parallel connection with said charge storage capacitor whereby undesired surge currents appearing at said charge storage capacitor are shunted by said second capacitor.

7. The high power factor conversion circuit of claim 1 wherein said feedback circuit means includes an adjustable impedance coupling said feedback rectifier circuit means to said junction of said series connected isolating diode and charge storage capacitor whereby said adjustable impedance controls the clamping capability and output power of said high power factor conversion circuit.

8. The high power factor conversion circuit of claim 1 including a drive optimizing circuit coupling said load circuit to said high frequency inverter means to alter the drive of said inverter means in response to alterations in said load circuit.

9. The high power factor conversion circuit of claim 1 wherein said high frequency inverter means is in the form of an oscillator having first and second transistors in series connection shunting said full-wave DC rectifier means with a second transformer having a primary winding coupled to said oscillator, a first secondary winding coupled to said load and a second secondary winding in circuit with said feedback rectifier circuit means and a first transformer having a primary winding in series connection with said primary winding of said second transformer, a first secondary winding coupled to said first and second transistors of said oscillator and a second secondary winding coupled to said first secondary winding of said second transformer in said load circuit to provide compensation for load variations.

* * * * *